United States Patent  [15] 3,642,582
McClary  [45] Feb. 15, 1972

[54] PURIFICATION OF ALPHA AMYLASE
[72] Inventor: Joseph E. McClary, Fulton, Mo.
[73] Assignee: Standard Brands Incorporated, New York, N.Y.
[22] Filed: July 14, 1969
[21] Appl. No.: 841,626

[52] U.S. Cl. .................................................195/66 R
[51] Int. Cl. ...................................................C07g 7/02
[58] Field of Search .......................................195/64, 66

[56] References Cited

UNITED STATES PATENTS

| | | | |
|---|---|---|---|
| 2,594,356 | 4/1952 | Schwimmer et al. | 195/64 |
| 2,121,459 | 6/1938 | Leitz et al. | 195/66 |
| 3,332,851 | 7/1967 | Corman | 195/31 |
| 3,134,723 | 5/1964 | Corman | 195/66 |
| 3,031,380 | 4/1962 | Minagawa et al. | 195/66 |

Primary Examiner—Lionel M. Shapiro
Attorney—Aaron B. Karas and William Koenen

[57] ABSTRACT

Aqueous alpha-amylase preparations may be purified by removing the polyvalent anions therefrom, and contacting the preparations with a fibrous alumina of the kind described in U.S. Pat. No. 2,915,475. The alpha-amylase will be adsorbed on the alumina and may subsequently be recovered therefrom by washing the same with a salt solution containing polyvalent anions. In the case where the alpha-amylase preparation is derived from fermentation of B. subtilis, protease is present in large quantities and when such a preparation is contacted with fibrous alumina the protease will remain in the effluent and can be recovered therefrom by well-known methods.

8 Claims, No Drawings

PURIFICATION OF ALPHA AMYLASE

THE INVENTION

This invention relates to a method of purifying aqueous alpha-amylase preparations and more particularly to the separation of alpha-amylase from other enzymes by adsorption.

In the preparation of alpha-amylase other enzymes are also generally produced. The presence of the other enzymes is sometimes objectionable in that they cause undesirable reactions during the use of the alpha-amylase preparation. Additionally, since there are usually relatively large amounts of the other enzymes present, it would be desirable to separate them from the alpha-amylase in order to take advantage of their particular reaction characteristics. Alpha-amylase preparations obtained from fermentation of *B. subtilis* and *Aspergillus oryzae*, for instance, contain large quantities of protease which if it could be separated economically would find commercial application.

It is known in the art that certain enzymes can be separated from others by adsorption. For instance, U.S. Pat. No. 2,121,459 describes a method for the preferential adsorption of protease on bauxite from enzyme mixtures containing alpha-amylase. However, following the method disclosed in this patent results in a relatively incomplete separation.

An object of the present invention is to provide a method of purifying aqueous alpha-amylase preparations by adsorption.

A further object of the present invention is to provide a method of adsorbing alpha-amylase from a broth obtained by fermentation which contains alpha-amylase and protease.

Another object of the present invention is to provide a method to prepare, from a fermentation broth containing both alpha-amylase and protease, a protease concentrate having a reduced alpha-amylase content.

These objects, and other objects which will be apparent from the following description, are attained in accordance with the present invention by contacting an aqueous alpha-amylase preparation with an adsorbent consisting essentially of inorganic microcrystalline fibrils of alumina to effect adsorption of the alpha-amylase on the adsorbent.

In some instances, alpha-amylase preparations produced by well-known methods, for instance by *B. subtilis* fermentation, contain relatively large quantities of protease and polyvalent anions such as phosphates, phytates, and sulphates among other substances. In order for the alpha-amylase to be adsorbed on the fibrous alumina, the polyvalent anions must be substantially removed from the enzyme preparations. Advantageously, this is accomplished by precipitating the anions by the use of soluble calcium salts, for instance calcium chloride. The amount of salts used should be at least sufficient to react stoichiometrically and to precipitate substantially all the polyvalent anions. A slight excess may be used without interfering with the adsorption of the alpha-amylase; however, a great excess will interfere with the alpha-amylase adsorption. For instance, alpha-amylase preparations produced by *B. subtilis* fermentation in commercial practice may contain 1,500 to 8,000 liquefons of alpha-amylase activity per milliliter of preparation and 200 to 800 casein units of protease activity per milliliter. If 2 to 4 grams of calcium chloride are added per 100 milliliters of such preparation and the pH of the preparation adjusted within a range of from about 5.5 to about 7.5, substantially all the polyvalent anions will be precipitated as insoluble calcium salts. Preferably the pH is adjusted to about 6.5 to effect precipitation. The defecated preparation can then be filtered, and the filtrate may contain between about 0.15 and 0.6 grams calcium per 100 milliliters of preparation. This level of calcium will not interfere with the adsorption of the alpha-amylase and is advantageous to stabilize the alpha-amylase against inactivation which may occur in later stages of processing.

The defecated preparation is contacted with the fibrous alumina in order to effect adsorption of the alpha-amylase thereon. Preferably the pH of the defecated preparation is in a range from about 5 to about 6. Exemplary of a suitable fibrous alumina which may be used in the method of the present invention is that described in U.S. Pat. No. 2,915,475. Generally, the fibrous alumina is in the form of fibrils having an average length of 100 to 1500 millimicrons and an axial ratio of from 20:1 to 300:1. Other physical characteristics of this fibrous alumina are that it has a surface area of 200 to 400 m.$^2$/g., X-ray diffraction pattern of boehmite and the ratio of peak intensities of the alumina to boehmite of a surface of less than 10 m.$^2$/g. at the 020 crystal lattice plane being less than 40:100. One type of such fibrous alumina is marketed under the trade name "Baymal" by E. I. du Pont de Nemours and Company, Wilmington, Delaware.

"Baymal," as supplied to users, contains acetate ions on the surfaces thereof, and, in order to achieve most efficient adsorption of the alpha-amylase, the acetate ions should be removed from the "Baymal." This can be accomplished either by prolonged washing with water or more easily by washing with an alkaline solution, for example at a concentration of about 0.03 pounds of NaOH per 1.5 gallons of water for every pound of "Baymal." The "Baymal" may be slurried in an alkaline solution and then filtered in order to provide a filter cake of "Baymal" through which the defecated enzyme preparation may be passed. A small amount of asbestos fiber may be provided in the slurry in order to prevent cracking of the "Baymal" filter cake, thus avoiding incomplete contacting of the enzyme preparation with the "Baymal."

The contacting of the defecated enzyme preparation with the fibrous alumina will result in relatively large amounts of the alpha-amylase being adsorbed. When "Baymal" is used as the adsorbent, substantially quantitative separation is achieved. The contacting of the alpha-amylase preparation with the fibrous alumina may be achieved by any convenient method, for instance, by passing the defecated enzyme preparation through a column or filter cake of the alumina or by slurrying the alumina with the enzyme preparation and then filtering the slurry to remove the alumina therefrom. The alumina may then be washed with water to remove any occluded enzyme preparation therefrom.

Elution of the alpha-amylase from the alumina may require washing it with a salt solution containing polyvalent anions. The pH of the eluent is not critical but preferably should be in the range from about 8 to about 9. The preferred sources of polyvalent anions are salts such as sodium sulfate, sodium phosphate, sodium citrate, sodium tartrate, or sodium borate or mixtures thereof. The salt concentration of the solution may vary over a wide range; for instance, in the case of sodium sulfate 2 percent by weight up to saturation has provided satisfactory results, with the preferred concentration being about 12 percent by weight. With a sodium sulfate solution as the eluent, it is not necessary to remove the sulfate anions from the eluate for most uses of the alpha-amylase. However, when certain other salts are used, it is usually necessary to remove the anion, since in some cases the anion will interfere with use of the alpha-amylase. These anions may be removed by precipitation and filtration. For instance, in the case of phosphates, the phosphate can be precipitated with soluble calcium or magnesium salts.

The purified unconcentrated alpha-amylase solution can be used for many applications, but usually it is advantageous to concentrate the solution into a syrup or to precipitate the alpha-amylase and recover it so as to provide a dry alpha-amylase product. The alpha-amylase may be precipitated, for example, by alcohol. In the case where a sodium sulfate solution is used to remove the alpha-amylase, 190 proof alcohol may be added to the eluate until about 100 proof is obtained. This will result in the precipitation of the sodium sulfate which may be filtered off. Then, more alcohol may be added until about 140 proof is obtained and precipitation of the alpha-amylase results.

Some alpha-amylase products require the presence of calcium, for instance, desizing products for textiles. The presence of calcium may be obtained by the addition of lime or calcium chloride to the purified alpha-amylase preparation in sufficient quantities to precipitate the sulfate as calcium sulfate and to provide the required excess.

Where the alpha-amylase is produced from a *B. subtilis* fermentation relatively large amounts of protease will also be present. In the procedure outlined above the protease will remain in the effluent of the alpha-amylase adsorbing step. The protease in the effluent may be concentrated in a known manner such as evaporating the water therefrom at reduced pressures and temperatures or by precipitation with acetone, alcohol and the like.

In order to more clearly describe the nature of the present invention, specific examples will hereinafter be given. It should be understood, however, that this is done solely by way of example and is intended neither to delineate the scope of the invention nor limit the ambit of the appended claims.

EXAMPLE I

To a *B. subtilis* fermentation broth was added 2.5 grams of $CaCl_2$ per 100 milliliter to precipitate bacterial cells and polyvalent anions. The pH was adjusted to 5.8 and the slurry was filtered on a Buchner funnel. A clear filtrate was obtained containing 6,000 liquefons of alpha-amylase and 375 casein units of protease per milliliter of filtrate. To 200 milliliters of the filtrate were added 12 grams of fibrous alumina (Baymal) and 24 grams of Johns-Manville Hyflow filter aid. The pH was adjusted to 5.5 and the mass was stirred for 2 hours. At this point the alpha-amylase content of the supernatant was 78 liquefons per milliliter and the protease content was 310 casein units per milliliter.

The solid and liquid phases were separated by filtration on an 8 centimeter Buchner funnel with No. 1 Whatman filter paper. Filtration was rapid, requiring about 2 minutes.

The liquid protease portion was concentrated under vacuum at 30° C. to approximately 50 percent solids. The concentrate contained 1,175 casein units per gram.

The cake of adsorbent and filter aid containing adsorbed alpha-amylase was suspended in 200 milliliters of water and 12 grams of $Na_2HPO_4 \cdot 7H_2O$ was added to the suspension. The pH was adjusted to 8.5 and the suspension was stirred about 30 minutes. At this point the supernatant contained 4,220 liquefons of alpha-amylase per milliliter. The phases were again separated by filtration on the 8 centimeter Buchner. The filtration required about 2 minutes.

The cake was resuspended in 200 milliliters of a solution containing 12 grams of $Na_2HPO_4 \cdot 7H_2O$. The pH was adjusted to 8.5 and the suspension was warmed, while stirring, to 40° C. After 2 hours the liquid phase contained 1,380 liquefons of alpha-amylase per milliliter. This eluate may be used to extract a subsequent alpha-amylase "Baymal" cake. At this point about 90 percent of the alpha-amylase was recovered in the eluate.

The first eluate, containing 4,220 liquefons of alpha-amylase per milliliter, was used for preparation of a concentrate. Eight grams of $MgCl_2$ (stoichiometric quantity of magnesium to replace sodium in 12 grams of $Na_2HPO_4$) were added to the 200 milliliters of eluate and the pH was adjusted to 7.5. The resulting precipitated salt (magnesium phosphate) was removed by filtration.

To 75 milliliters of the filtrate was added 175 milliliters of 95 percent alcohol. The resulting white flocculant precipitate was recovered on a filter pad, air dried, and assayed. The air-dried sample contained 600,000 liquefons of alpha-amylase activity per gram.

One hundred milliliters of the filtrate from the $MgCl_2$ treatment was concentrated to 16 milliliters under vacuum at 30° C. Alcohol was added to 140 proof and the precipitate was recovered. The product amounting to about 0.7854 grams, assayed 400,000 liquefons of alpha-amylase per gram.

EXAMPLE II

This example illustrates reuse of the adsorbent.

Two hundred milliliters of fresh filtrate obtained from a defecated *B. subtilis* fermentation broth, containing 6000 liquefons per milliliter of alpha-amylase, were mixed with the "Baymal" cake from the process described in Example I, at a pH 5.5 for 2 hours. The supernatant assayed 630 liquefons of alpha-amylase per milliliter. One and nine-tenths grams of fresh "Baymal" were added to the suspension to bring the total "Baymal" in the suspension to 13.9 grams. After an hour of stirring the supernatant assayed 266 liquefons of alpha-amylase per milliliter. At least 82,000 units were adsorbed per gram of adsorbent. The suspension was filtered.

The filtrate contained 150 casein units of protease per milliliter. A sample was concentrated to about 50 percent solids under vacuum at 40° C. It assayed 970 casein units per gram.

The filter cake containing the alpha-amylase was suspended in the dilute eluate from a prior elution cycle. The eluate contained about 12 grams of disodium phosphate and 1,470 liquefons of alpha-amylase per milliliter. The pH was adjusted to 8.5 and the slurry was stirred about 1 hour and filtered. The filtrate amounting to 250 milliliters contained 4,880 liquefons of alpha-amylase per milliliter. The cake was resuspended in about 200 milliliters of water with 15 grams of disodium phosphate, stirred an hour and filtered. The filtrate assayed 1010 liquefons of alpha-amylase per milliliter. The total alpha-amylase recovered was 1,063,000 liquefons.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

The following is claimed:

1. A method of purifying an aqueous alpha-amylase preparation containing polyvalent anions, said preparation being derived from a *B. subtilis* fermentation comprising removing substantially all polyvalent anions from said preparation and thereafter contacting the preparation with an adsorbent consisting essentially of inorganic microcrystalline fibrils of alumina to effect adsorption of the alpha-amylase on the adsorbent.

2. A method of purifying an alpha-amylase preparation as defined in claim 1, wherein the enzyme preparation is at a pH between about 5.5 and about 7.5 before being contacted with the adsorbent.

3. A method of purifying an alpha-amylase preparation as defined in claim 2, wherein the polyvalent anions are removed by precipitation.

4. A method of purifying an alpha-amylase preparation as defined in claim 3, wherein the alpha-amylase adsorbed on the adsorbent is eluted therefrom by a salt solution containing polyvalent anions.

5. A method of purifying an alpha-amylase preparation as defined in claim 3, wherein a soluble calcium salt is dissolved in the aqueous enzyme preparation to effect precipitation of the polyvalent anions as insoluble calcium salts.

6. A method of purifying an alpha-amylase preparation as defined in claim 5, wherein precipitation of the insoluble salts is effected at a pH in the range between about 5.5 and about 8.

7. A method of purifying an alpha-amylase preparation as defined in claim 6, wherein the preparation is derived from a *B. subtilis* fermentation and contains substantial quantities of protease.

8. A method of purifying an alpha-amylase preparation as defined in claim 7, wherein the adsorbent is fibrous alumina, the fibrils have an average length of 100 to 1,500 millimicrons and an axial ratio of from 20:1 to 300:1, a surface area being 200 to 400 m.$^2$/g., and an X-ray diffraction pattern of boehmite and the ratio of peak intensities of the alumina to boehmite of a surface of less than 10 m.$^2$/g. at the 020 crystal lattice plane being less than 40:100.

* * * * *